United States Patent [19]
Mehrer et al.

[11] Patent Number: 5,856,385
[45] Date of Patent: Jan. 5, 1999

[54] ADDITIVE MIXTURE HAVING A NUCLEATING ACTION FOR PLASTICS COMPOSITIONS

[75] Inventors: Mathias Mehrer, Gablingen; Gerhard Pfahler, Augsburg; Thomas Stährfeldt, Neusäss, all of Germany

[73] Assignee: Hoechst Aktiengesellschaft, Frankfurt, Germany

[21] Appl. No.: 826,724

[22] Filed: Apr. 7, 1997

[30] Foreign Application Priority Data

Apr. 9, 1996 [DE] Germany ............... 196 14 067.6

[51] Int. Cl.[6] .................................................. C08K 5/15
[52] U.S. Cl. .................................................... 524/108
[58] Field of Search ........................... 252/392; 524/108

[56] References Cited

U.S. PATENT DOCUMENTS

| 5,225,466 | 7/1993 | Akao | 524/108 |
| 5,426,141 | 6/1995 | Akao | 524/110 |

*Primary Examiner*—Kriellion S. Morgan
*Attorney, Agent, or Firm*—Miles B. Dearth

[57] ABSTRACT

The present invention relates to additive mixtures having a nucleating action for plastic compositions, comprising nucleating agents based on dibenzylidenesorbitol, or derivatives therof, and amido-functional compounds. The aldehydes formed from the nucleating agents by decomposition during processing and use of the plastics treated therewith are collected and bound by adsorption, absorption and/or chemcial reaction.

17 Claims, No Drawings

ADDITIVE MIXTURE HAVING A NUCLEATING ACTION FOR PLASTICS COMPOSITIONS

The present invention relates to additive mixtures having a nucleating action for plastic compositions in order to reduce the liberation of products of the decomposition of dibenzylidenesorbitol derivatives during processing of polymers. These derivatives are employed as nucleating agents in the processing of polyolefins (EP-A-68773), preferably in the processing of polypropylene (U.S. Pat. No. 4,016,118).

In the processing of polymers, a nucleating action can be caused by using dibenzylidenesorbitol or derivatives of this compound (JP SHO 54-121696). These nucleating agents form structures in the polymer melt which cause the formation of a large number of very small crystallites in the polymeric organic material (cf. T. L. Smith et al., Macromolecules 27 [1994] 3147–3155). These nucleating agents are usually added to the polymeric organic material before processing and develop a nucleating action during the course of the processing, particularly on cooling of the polymer melt. Transparency, hardness, impact resistance and modulus of elasticity of a molding produced in this way are thus significantly improved.

A significant problem here is partial decomposition of the nucleating agent dibenzylidenesorbitol or derivatives thereof, which can take place before, during or after processing of a polymer containing this additive. Partial decomposition of the derivatives of dibenzylidenesorbitol occurs in particular during processing, attributable essentially to thermal decomposition which takes place at the high temperatures of, usually, well above 200° C. which are correspondingly usual (U.S. Pat. No. 5,198,484, column 3, line 12). In addition, the hydrolysis of the acetalic structure, which is fairly labile chemically, has been blamed for partial cleavage of the dibenzylidenesorbitol derivatives (EP-A-451 002, p. 2, line 28), which is of particular importance in the presence of traces of acid.

This decomposition also results, inter alia, in a certain odor nuisance, which is attributable directly to the liberation of an aromatic aldehyde (EP-A421 634, p. 3, line 50).

The liberated aldehyde has a severe adverse effect on the odor and flavor properties of the correspondingly nucleated material. EP-A-421 634 proposes using a derivative of dibenzylidenesorbitol which, in the case of partial decomposition, liberates an aldehyde which is only weakly perceptible by the sense of smell and taste in humans. In this case, however, neither the partial decomposition of the dibenzylidenesorbitol derivative nor the liberation of undesired decomposition products is reduced, i.e. the cause of the problem is not eliminated.

A large number of patent specifications recommend the use of additional chemicals intended to stabilize the chemically labile, acetalic structure of the dibenzylidenesorbitol derivatives. Particularly basic additives are of importance therein, since cleavage of the dibenzylidenesorbitols is catalyzed principally by acidic media. U.S. Pat. No. 4,518,582 and U.S. Pat. No. 4,720,381 describe magnesium sulfate, zinc acetate and hexamethylene triamine in this sense. U.S. Pat. No. 4,722,835 describes metal salts, such as, in particular, zinc oxide, calcium acetate, magnesium acetate, calcium carbonate and calcium hydroxide. EP-A-451,002 describes the use of organic bases; urea, imidazole, 2-amino-2-hydroxymethyl-1,3-propanediol, 2-amino-2-methyl-1-propanol and N,N-tetrakis-2-hydroxypropylethylenediamine are emphasized as being particularly suitable.

It has now been found that the addition of amido-functional compounds, such as polyamides, amide waxes, thermoplastic polyamide resins or mixtures thereof, significantly reduces the liberation of decomposition fragments of dibenzylidenesorbitol derivatives, in particular the liberation of the resultant aldehydes. The aromatic aldehyde formed on any decomposition is immediately trapped and bound by adsorption, absorption and/or chemical reaction without leaving the molding.

This reduces the known organoleptic problem of the above-described nucleating agents inasmuch as significantly less aldehyde can be perceived by the human sense of smell and taste before, during and after processing of the polymer containing novel additives than is the case without them.

While the abovementioned patent specifications concentrate on reducing hydrolysis of the dibenzylidenesorbitol derivatives, the use of a compound which specifically scavenges the aldehyde has not been described before.

The invention thus relates to additive mixtures having a nucleating action for plastic compositions, comprising nucleating agents based on dibenzylidenesorbitol, or derivatives thereof, and amido-functional compounds.

The nucleating agents are 1,3:2,4-diarylidene-D-sorbitols, preferably 1,3:2,4-di(benzylidene)-D-sorbitol, 1,3:2,4-di-(4-tolylidene)-D-sorbitol, 1,3:2,4-di(4-ethylbenzylidene)-D-sorbitol and 1,3:2,4-di(3,4-dimethylbenzylidene)-D-sorbitol and mixtures of these products with one another.

The structural formula for this class of compounds, in which R and $R_1$ to $R_4$, independently of one another, are hydrogen, $C_1$–$C_5$-alkyl, hydroxyl, methoxy, mono- or dialkylamino, nitro or halogen, is as follows:

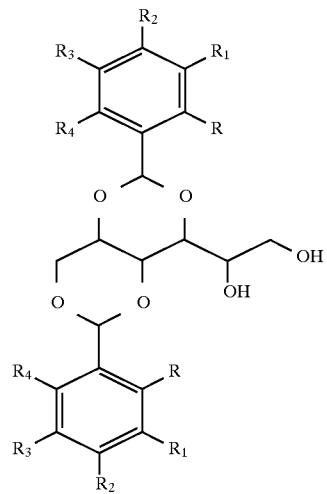

Of the various novel amide waxes and polyamides, mono- and bisamides of fatty acids and oligomeric or polymeric thermoplastic polyamide resins are particularly suitable; very particularly suitable are bisstearoylethylenediamine and bislauroylethylenediamine, and oligomeric or polymeric polyamide resins, whose starting materials can be straight-chain $C_6$–$C_{12}$-ω-aminocarboxylic acids, or lactams thereof; adipoyl, azelaoyl, sebacoyl, dodecanedicarbonyl and heptadecanedicarbonyl-hexamethylenediamine; isophthalic acid; bis(4-aminocyclohexyl)methane; 2,2-bis(4'-aminocyclohexyl)propane; 3, 3'-dimethyl-4,4'-diaminodicyclohexylmethane; terephthalic acid or the dimethyl ester thereof; 1,6-diamino-2,2,4-trimethylhexane; 1,6-diamino-2,4,4-trimethylhexane; hexamethylenediamine; 1-amino-3-aminomethyl-3,5,5- trimethylcyclohexane; bis(hexamethylene)triamine; diethylenetriamine; diphenylamine; ethylenediamine; poly(oxypropylene)diamine; tetraethylenepentamine or triethylenetetramine.

The mixing ratio between the amido-functional compound and the nucleating agent is generally in the range from 99:1 to 1:99 parts by weight, preferably from 3:1 to 1:3, very particularly preferably from 1.5:1 to 1:1.5.

The plastic composition containing the dibenzylidenesorbitol derivatives contains the added amido-functional compounds in a concentration of from 0.01 to 5% by weight, preferably from 0.1 to 1.0% by weight, based on the entire polymeric material. The same amounts apply to the concentration of dibenzylidenesorbitol derivative.

The organic material stabilized by the novel compounds may, if desired, also contain further additives, for example antioxidants, light stabilizers, metal deactivators, lubricants, antistatics, flame inhibitors, pigments and fillers. Examples of such additives are substances as described in EP-A-705 836.

Other suitable additives are 2,2',2"-nitrilo[triethyltris(3, 3',5,5'-tetra-tert-butyl-1,140 -biphenyl-2,2'-diyl) phosphite]; ethyl bis[2-methyl-4,6-bis(1,1-dimethylethyl)phenol] phosphite; secondary hydroxylamines, for example distearylhydroxylamine or dilaurylhydroxylamine; zeolites, for example DHT 4A; the product of the condensation of N,N'-bis[(4,6-di(4-n-butylamino-2,2,6,6-tetramethylpiperid-4-yl)-1,3,5-triazin-2-yl]-3-aminopropylethylene-1,2-diamine and 2,4-dichloro-6-(4-n-butylamino-2,2,6,6-tetramethylpiperid-4-yl)1,3,5-triazine.

The material provided in accordance with the invention with additives can also contain costabilizers which are able to suppress, in particular, acid-catalyzed hydrolysis of the nucleating agent, for example metal salts, in particular zinc oxide, zinc stearate, zinc acetate, magnesium oxide, magnesium acetate, magnesium sulfate, calcium oxide, calcium acetate, calcium carbonate, calcium stearate and calcium hydroxide; organic bases, for example hexamethylenetriamine, urea, imidazole, 2-amino-2-hydroxymethyl-1,3-propanediol, 2-amino-2-methyl-1-propanol, N,N-tetrakis-2-hydroxypropylethylenediamine, melamin and cyanoguanidine.

The organic, polymeric material is, for example, a crystalline or partially crystalline polyolefin, such as a homopolymer or copolymer of PP, PE-HD or LLDPE.

EXAMPLES

Various polypropylene mixtures were prepared and converted into moldings.

1. Polymer Mixtures

The following mixtures were investigated:

The abbreviations have the following meanings:

Basis=mixture of:
  100 parts of unstabilized polypropylene (product and registered trademark of HOECHST AG, ®Hostalen PPK 0160, MFI [190° C./5 kg]=2);
  0.1 part of pentaerythrityl tetrakis[3-(3,5-di-tert-butyl-4-hydroxyphenyl)propionate] (product and registered trademark of HOECHST AG, ®Hostanox O10);
  0.1 part of tris(2,4-di-tert-butylphenyl) phosphite (product and registered trademark of HOECHST AG, ®Hostanox PAR 24);
  0.1 part of calcium stearate (product and registered trademark of Peter Greven Fett-Chemie GmbH & Co. KG, Bad Münstereifel, ®Liga 8600).
Nucl. 1=1,3:2,4-di(4-methylbenzylidene)-D-sorbitol (product and registered trademark of RV Chemicals Ltd., UK, ®Geniset MD);
Nucl. 2=1,3:2,4-di(3,4-dimethylbenzylidene)-D-sorbitol (product and registered trademark of Milliken, USA, ®Millad 3988);
PA 1=nylon 6,6 (product and registered trademark of BAYER AG, ®Durethan AKV);
PA 2=thermoplastic polyamide resin (product and registered trademark of WITCO GmbH, Bergkamen, ®Eurelon 964);
PA 3=thermoplastic polyamide resin (product and registered trademark of WITCO GmbH, Bergkamen, ®Eurelon 975).
FA 1=bisstearoyl- and/or bispalmitoyl-ethylenediamine (product and registered trademark of HOECHST AG, ®Hostalub FA1).

2. Production of the Moldings

2.1. Granulation

In order to prepare the basis, 100 parts by weight of polypropylene, 0.1 part by weight of pentaerythrityl tetrakis [3-(3,5-di-tert-butyl-4-hydroxyphenyl)propionate], 0.1 part by weight of tris-(2,4-di-tert-butylphenyl) phosphite and 0.1 part by weight of calcium stearate were premixed in a Diosma mixer from Dierks & Söhne, Osnabrück, for 10 min at room temperature and 720 rpm. 0.2 part by weight of nucleating agent Nucl. 1 or Nucl. 2 was added to the basis mixture, and 0.2 part by weight of PA1, PA2, PA3 or FA1 was then added. The mixture was again homogenized intensively and granulated using an extruder from Leistritz AG, Nuremberg, LSM 30.34 gg (counterrotating screws). The temperatures in the seven heating zones were 200° C., 210° C., 220° C., 230° C., 230° C., 240° C. and 240° C. The temperature of the extruded material at the die was 255° C. The material was cooled in a water bath, dried using a compressed-air device and comminuted in a cutting device to give uniform granules.

TABLE 1

| Mat. | No. 1 | No. 2 | No. 3 | No. 4 | No. 5 | No. 6 | No. 7 | No. 8 | No. 9 | No. 10 | No. 11 |
|---|---|---|---|---|---|---|---|---|---|---|---|
| Basis | 100 | 100 | 100 | 100 | 100 | 100 | 100 | 100 | 100 | 100 | 100 |
| Nucl. 1 | | 0.2 | | 0.2 | | 0.2 | | 0.2 | | 0.2 | |
| Nucl. 2 | | | 0.2 | | 0.2 | | 0.2 | | 0.2 | | 0.2 |
| PA 1 | | | | 0.2 | 0.2 | | | | | | |
| PA 2 | | | | | | 0.2 | 0.2 | | | | |
| PA 3 | | | | | | | | 0.2 | 0.2 | | |
| FA 1 | | | | | | | | | | 0.2 | 0.2 |

2.2. Injection molding

The granules from 2.1. were converted further into test specimens using an injection-molding machine from Toshiba Machine Co., Japan, 100 EN. The temperatures in the four heating zones were 210° C., 220° C., 230° C. and 240° C. The temperature of the material emerging from the injection-molding die was 230° C., and the temperature of the mold was 25° C. The test specimens were disks with a thickness of 1 mm and a diameter of 64 mm.

3. Evaluation

3.1. Organoleptic testing of the granules 100 g of the granules from 2.1. were stored in a closed glass vessel with a volume of 0.5 l for a period of 12 hours at 50° C. After cooling to room temperature, the intensity of the odor emanating from the granules was assessed by a test panel of 3 persons. The odor intensity was assessed using a scale of from 1 to 10. Since even pure polypropylene has a slight inherent odor, the score 1 was given to the odor level of pure polypropylene. The sample with the strongest odor was given the score 10. The results of the organoleptic test carried out in this way are shown in Table 2. The scores are mean values of the assessment carried out by the test panel and correspond well to the findings from EP 421 634, p. 8, Ex. 4.

TABLE 2

| Gran. No. | 1 | 2 | 3 | 4 | 5 | 6 | 7 | 8 | 9 | 10 | 11 |
|---|---|---|---|---|---|---|---|---|---|---|---|
| Score | 1 | 10 | 4 | 6 | 3 | 5 | 3 | 2 | 2 | 2 | 2 |

3.2. Measurement of the transparency of injection-molded test specimens

The nucleating action of the additive mixtures employed in the polymeric material was characterized by means of the light scattering (haze). A clear test specimen has a small value. These measurement values were determined using an instrument from BYK Gardner GmbH, Geretsried, (Hazegard System XL-211). The values in Table 3 are means of ten measurements on in each case different test specimens from 2.2. with the same mixture composition.

TABLE 3

| Gran. No. | 1 | 2 | 3 | 4 | 5 | 6 | 7 | 8 | 9 | 10 | 11 |
|---|---|---|---|---|---|---|---|---|---|---|---|
| Haze | 55 | 11 | 12 | 24 | 26 | 20 | 22 | 14 | 15 | 15 | 15 |

4. Assessment of the Results

The results show that use of amido-functional compounds, such as nylon 6,6, amide wax or thermoplastic polyamide resins, can significantly reduce the odor nuisance blamed on the use of a nucleating agent from the dibenzylidenesorbitol class of substances. The polyamides should as far as possible be used in dry form, since otherwise slight yellowing of the polyolefins may occur. Slight yellowing of the test specimen is also observed when sufficiently predried material (in powder form) is used together with nylon 6,6, which probably explains the comparatively poor haze value of test specimens 4 and 5. By contrast, the use of amide wax (in particular ®Hostalub FA1) or thermoplastic polyamide resins (in particular ®Eurelon 975) gives no color problems.

When 1,3:2,4-di(3,4-dimethylbenzylidene)-D-sorbitol is used, small, dust-like particles ("fish eyes") are always visible in the test specimens. The somewhat poorer haze value of the test specimen treated with 1,3:2,4-di(3,4-dimethylbenzylidene)-D-sorbitol compared with material treated with 1,3:2,4-di(4-methylbenzylidene)-D-sorbitol can be explained by the formation of precisely these fish eyes in the material. This effect is easy to understand, since 1,3:2,4-di(3,4-dimethylbenzylidene)-D-sorbitol (m.p.=265°–268° C.) does not reach its melting point at the processing temperatures of polypropylene. By contrast, 1,3:2,4-di(4-methylbenzylidene)-D-sorbitol is liquid at the processing temperatures of polypropylene owing to its lower melting point (m.p.=250°–252° C.) and can therefore be distributed fully in the polymeric material.

We claim:

1. An additive mixture having a nucleating action for plastic compositions, consisting essentially of nucleating agents based on dibenzylidenesorbitol, or derivatives thereof, and amido-functional compound consisting of thermoplastic polyamide resin.

2. The mixture as claimed in claim 1, wherein the nucleating agents are 1, 3:2,4-di(benzylidene)-D-sorbitol, 1, 3:2,4-di-(4-tolylidene)-D-sorbitol, 1,3:2,4-di(4-ethylbenzylidene)-D-sorbitol or 1,3:2,4-di(3,4-dimethylbenzylidene)-D-sorbitol or a mixture thereof.

3. The mixture as claimed in claim 1, wherein the mixing ratio between the amido-functional compound and the nucleating agent is in the range from 99:1 to 1:99 parts by weight.

4. A plastic composition which comprises the additive mixture as claimed in claim 1.

5. The plastic composition as claimed in claim 4, wherein the plastic composition is a polyolefin.

6. The plastic composition as claimed in claim 4 which contains said polyamide in a concentration of from 0.01 to 5% by weight, based on the entire polymeric material.

7. The mixture as claimed in claim 1, wherein the mixing ratio between the amido-functional compound and the nucleating agent is in the range from 3:1 to 1:3 parts by weight.

8. The mixture as claimed in claim 7, wherein the mixing ratio between the amido-functional compound and the nucleating agent is in the range from 1.5:1 to 1:1.5 parts by weight.

9. The plastic compositions as claimed in claim 5, wherein said polyolefin is polypropylene, high density polyethylene or linear low density polyethylene.

10. The plastic composition as claimed in claim 6, which contains said polyamide in concentration of from 0.1 to 1% by weight, based on the entire polymeric material.

11. The mixture as claimed in claim 1, wherein said nucleating agent is

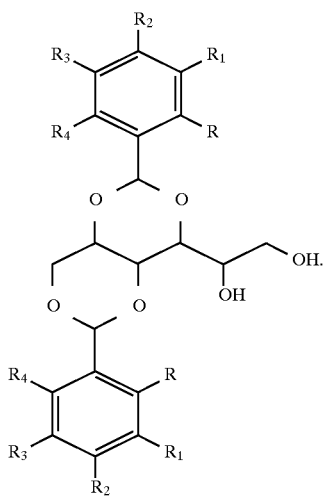

wherein R and $R_1$ to $R_4$ independently of one another are hydrogen $C_1$–$C_5$-alkyl, hydroxyl, methoxy, monoalkylamino, dialkylamino, nitro or halogen.

12. The plastic composition as claimed in claim 4, wherein said plastic composition is a nucleating plastic composition.

13. The process as claimed in claim 12, wherein the amido-functional compounds are polyamides, amide waxes, thermoplastic polyamide resins or mixtures thereof.

14. The process as claimed in claim 13, wherein nucleating agents are 1,3:2,4-di(benzylidene)-D-sorbitol, 1,3:2,4-di-(4-tolyidene)-D-sorbitol, 1,3:2,4-di(4-ethylbenzylidene)-D-sorbitol or 1,3:2,4-di(3,4-dimethylbenzylidene)-D-sorbitol or a mixture thereof.

15. The process as claimed in claim 12, wherein aldehydes are formed by the decomposition of the nucleating agent and are collected and bound by adsorption, absorption chemical reaction or a mixture thereof.

16. A process for the use of an amido-functional compound consisting of thermoplastic polyamide resin for reducing the incidence of odor from decomposition fragments of dibenzylidene sorbitol-based nucleating agent when contained in a thermoplastic which is processed at a temperature of at least 200° C., consisting of combining said amido- functional compound with said dibenzylidene sorbitol-based nucleating agent in said thermoplastic and processing said thermoplastic at a temperature of at least 200° C.

17. The process of use according to claim 16 wherein said dibenzylidene sorbitol and said amido-functional compound is combined as an additive mixture for said thermoplastic.

* * * * *